United States Patent Office 3,326,665
Patented June 20, 1967

3,326,665
PROCESS FOR THE MANUFACTURE OF GRANULAR UREA-ALDEHYDE FERTILIZER
Helmut Karl Schäfer, Frankfurt am Main, and Paul Wilhelm Krause, Gustavsburg, Germany, assignors to Farbwerke Hoechst Aktiengesellschaft vormals Meister Lucius & Bruning, Frankfurt am Main, Germany, a corporation of Germany
No Drawing. Filed July 10, 1964, Ser. No. 381,922
Claims priority, application Germany, July 19, 1963, F 40,275
6 Claims. (Cl. 71—28)

The present invention relates to granulated fertilizers and to a process for their manufacture.

In the manufacture of fertilizers with delayed nitrogen action by condensing urea with higher aldehydes, there is often encountered the difficulty that the products are obtained in the form of powders which give off dust in a high degree. This renders their use in agriculture extremely difficult or even impossible.

This applies especially to condensation products of urea with aldehydes having 3 to 4 carbon atoms such, for example, as propionaldehyde or isobutyraldehyde. This condensation product is always obtained in the form of a fine powder which can subsequently be granulated only with difficulty. This is true whether said condensation product is prepared in a solvent, such as water or methanol, or by dry condensation with the exclusion of a solvent.

Now we have found a process for the manufacture of granulated fertilizers by condensing urea with aldehydes having 3 to 4 carbon atoms with the exclusion of a solvent, in which process, prior to the condensation, there is added to the starting products a swellable substance of medium to high molecular weight, for example modified cellulose, such as methyl cellulose or carboxymethyl cellulose, modified polyacrylonitrile, for example polyacrylamide, polyvinyl alcohol or substances of medium- to high-molecular weight having similar properties, in an amount within the range of 0.2 to 5%, especially 0.3 to 1%, calculated on the final product.

There is first formed a plastic granular product which can be hardened either in the same apparatus or in a connected drying apparatus. In the latter case, fine and oversize grains may be removed by sieving and returned to the granulating apparatus. Suitable apparatus are, for example, paddle screws, Erich mixers or rotary tubes.

Application of the aforesaid auxiliary agents to the finished, pulverulent condensation products is much less effective and requires, moreover, cumbersome additional process steps.

The products obtained according to the process of the present invention are stable, freely flowing granular products. They are good nitrogenous fertilizers which release their content of nitrogen gradually. They not only contain nitrogen which is readily soluble in water but also nitrogen difficultly soluble in water. The nitrogen content can be determined by the analysis method of Kralovec and Morgan (cf. Journal of Agriculture and Food Chemistry, 2, 92 (1954)). The fertilizers can be handled easily, do not give off dust and can be spread by all types of fertilizer distributors.

The following examples serve to illustrate the invention, but they are not intended to limit it thereto:

Example 1

24 kg. of urea were blended with 250 g. of methyl cellulose. The blend was ground in a cross beater mill and combined in an Eirich mixer for 2 hours with 15.2 kg. of isobutyraldehyde of 95% strength, 500 cc. of sulfuric acid of 50% strength and 1.5 liters of water with condensation taking place between the urea and the isobutyraldehyde.

A plastic granular product was formed which was dried in a drying chamber for 2 hours at 115° C.

92% of the granules of the product had a particle size of 0.2 to 3 mm. and 8% had a particle size exceeding 3 mm.

The product contained 32.2% of nitrogen of which 45% was readily soluble in water, 54% difficultly soluble in water and 1% insoluble in water.

Example 2

48 kg. of urea were blended with 500 g. of carboxyl methyl cellulose in a closed granulating screw provided with a heating jacket. While the screw was in operation, 31.5 kg. of isobutyraldehyde of 95% strength, 1 liter of sulfuric acid of 50% strength and 4 liters of water were run into this mixture during the course of 3.5 hours. While the mixture slightly warmed up spontaneously, condensation took place. Then the product was dried by introducing steam into the heating jacket.

A round, fine-grained granular product was obtained that did not give off dust. The nitrogen content of the product was 30%, of which 33% was readily soluble in water, 66% difficultly soluble in water and 1% insoluble in water.

We claim:

1. In a process for the manufacture of fertilizers by condensing urea and an aldehyde having three to four carbon atoms with the exclusion of a solvent, the improvement which comprises adding to the starting products, prior to the condensation, a swellable substance of medium- to high-molecular weight in an amount of from 0.2 to 5 percent by weight of the final product.

2. A process as in claim 1 wherein said swellable substance is a member selected from the group consisting of modified cellulose, polyacrylamide, and polyvinyl alcohol.

3. A process as in claim 2 wherein said swellable substance is present in an amount of 0.3 to 1 percent by weight of the final product.

4. A process as in claim 3 wherein said swellable substance is modified cellulose.

5. A process for the manufacture of granulated fertilizers as claimed in claim 4, wherein said modified cellulose is methyl cellulose.

6. A process for the manufacture of granulated fertilizers as claimed in claim 4, wherein said modified cellulose is carboxymethyl cellulose.

References Cited

UNITED STATES PATENTS

| | | | |
|---|---|---|---|
| 3,024,098 | 3/1962 | Austin et al. | 71—64 X |
| 3,062,637 | 11/1962 | Martles et al. | 71—64 X |
| 3,219,432 | 11/1965 | Schafer et al. | 71—28 |

DONALL H. SYLVESTER, Primary Examiner.

R. BAJEFSKY, Assistant Examiner.